(12) United States Patent
Luo et al.

(10) Patent No.: US 12,431,106 B2
(45) Date of Patent: Sep. 30, 2025

(54) IMAGE DISPLAY METHOD AND APPARATUS, ELECTRONIC DEVICE, AND STORAGE MEDIUM

(71) Applicant: Beijing Zitiao Network Technology Co., Ltd., Beijing (CN)

(72) Inventors: Ruchong Luo, Beijing (CN); Wentao Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/744,438

(22) Filed: Jun. 14, 2024

(65) Prior Publication Data

US 2024/0339091 A1    Oct. 10, 2024

Related U.S. Application Data

(63) Continuation of application No. PCT/CN2022/138868, filed on Dec. 14, 2022.

(30) Foreign Application Priority Data

Dec. 14, 2021 (CN) .......................... 202111530229.2

(51) Int. Cl.
  *G09G 5/02* (2006.01)
  *G06T 7/90* (2017.01)

(52) U.S. Cl.
  CPC ............... *G09G 5/026* (2013.01); *G06T 7/90* (2017.01); *G06T 2207/10024* (2013.01);
  (Continued)

(58) Field of Classification Search
  CPC .... H04N 5/44504; H04N 23/80; H04N 23/74; H04N 23/741; H04N 23/56;
  (Continued)

(56) References Cited

U.S. PATENT DOCUMENTS 5,237,648 A * 8/1993 Mills .................... G11B 27/034
                                                    715/974
5,353,391 A * 10/1994 Cohen .................. G11B 27/034
                                                    715/810
(Continued)

FOREIGN PATENT DOCUMENTS

CN         104299252 A       1/2015
CN         105183296 A       12/2015
(Continued)

OTHER PUBLICATIONS

Wan T, Zhu C, Qin Z. Multifocus image fusion based on robust principal component analysis. Pattern Recognition Letters. Jul. 1, 2013;34(9):1001-8.*
(Continued)

*Primary Examiner* — Phu K Nguyen
(74) *Attorney, Agent, or Firm* — Astute IP Law Group

(57) ABSTRACT

Embodiments of the disclosure disclose an image display method and apparatus, an electronic device, and a storage medium. The method includes: obtaining a first image and a second image that are to be displayed; displaying, in response to receiving a display triggering operation for triggering image display, the first image in an image display area; displaying, in response to detecting that a display condition of a target transition image is satisfied, the target transition image in the image display area, where the target transition image is a fusion image of the first image and the second image; and displaying, in response to detecting that a display condition of the second image is satisfied, the second image in the image display area.

18 Claims, 4 Drawing Sheets

(52) U.S. Cl.
CPC .............. *G06T 2207/20221* (2013.01); *G09G 2320/10* (2013.01); *G09G 2340/045* (2013.01); *G09G 2340/10* (2013.01); *G09G 2340/12* (2013.01)

(58) Field of Classification Search
CPC .... H04N 25/683; H04N 23/20; H04N 23/951; H04N 25/60; H04N 23/81; H04N 23/76; H04N 5/33; H04N 23/72; G06T 2207/20192; G06T 7/13
USPC .......................................................... 345/418
See application file for complete search history.

(56) References Cited

U.S. PATENT DOCUMENTS

| | | | |
|---|---|---|---|
| 7,302,113 B2* | 11/2007 | Pilu | G06V 40/16 345/646 |
| 7,747,289 B2* | 6/2010 | Wang | H04M 1/72469 455/418 |
| 2008/0075388 A1 | 3/2008 | Nishijima | |
| 2011/0221775 A1 | 9/2011 | Tsai | |
| 2013/0176332 A1 | 7/2013 | Alenius | |
| 2016/0104301 A1 | 4/2016 | Liu et al. | |
| 2020/0211183 A1* | 7/2020 | He | G06T 7/0012 |
| 2021/0278836 A1 | 9/2021 | Li | |
| 2022/0269937 A1* | 8/2022 | Kim | G06N 3/08 |

FOREIGN PATENT DOCUMENTS

| | | |
|---|---|---|
| CN | 107704300 A | 2/2018 |
| CN | 110062271 A | 7/2019 |
| CN | 112732377 A | 4/2021 |
| CN | 113010249 A | 6/2021 |
| CN | 109947338 B | 8/2021 |
| CN | 113709545 A | 11/2021 |
| CN | 113784038 A | 12/2021 |
| CN | 114245028 A | 3/2022 |

OTHER PUBLICATIONS

International Search Report for PCT/CN2022/138868, mailed Jan. 20, 2023, 6 pages.
Office Action for Chinese Patent Application No. 202111530229.2, mailed Jun. 21, 2023, 10 pages.
Extended European Search Report for European Patent Application No. 22906587.5, mailed on Jan. 23, 2025, 11 pages.

* cited by examiner

IMAGE DISPLAY METHOD AND APPARATUS, ELECTRONIC DEVICE, AND STORAGE MEDIUM

CROSS-REFERENCE TO RELATED APPLICATION(S)

The disclosure is a Continuation Application of International Patent Application Serial No. PCT/CN2022/138868, filed on Dec. 14, 2022, which claims the priority to Chinese Patent Application No. 202111530229.2, filed with the Chinese Patent Office on Dec. 14, 2021, the disclosures of which are incorporated in their entireties herein by reference.

FIELD

Examples of the disclosure relate to the technical field of image processing, and relate to, for instance, an image display method and apparatus, an electronic device, and a storage medium.

BACKGROUND

As intelligent terminals and Internet technologies continuously develop, interaction between terminals and users has become increasingly diversified. Images, one of the important carriers of information dissemination, are favored by widespread users.

In a scene to display a number of images, related images are generally displayed in such a way that a current image is directly switched to a to-be-displayed next image in a display order. By this way, display of the images is simple but less in richness and interestingness, and is far from satisfying effect demand of the users.

SUMMARY

Examples of the disclosure provide an image display method and apparatus, an electronic device, and a storage medium, so as to improve an image display effect.

In a first aspect, an example of the disclosure provides an image display method. The method includes: obtaining a first image and a second image that are to be displayed; displaying, in response to receiving a display triggering operation for triggering image display, the first image in an image display area; displaying, in response to detecting that a display condition of a target transition image is satisfied, the target transition image in the image display area, where the target transition image is a fusion image of the first image and the second image; and displaying, in response to detecting that a display condition of the second image is satisfied, the second image in the image display area.

In a second aspect, an example of the disclosure further provides an image display apparatus. The apparatus includes: an image obtaining module configured to obtain a first image and a second image that are to be displayed; a first display module configured to display, in response to receiving a display triggering operation for triggering image display, the first image in an image display area; a transition display module configured to display, in response to detecting that a display condition of a target transition image is satisfied, the target transition image in the image display area, where the target transition image is a fusion image of the first image and the second image; and a second display module configured to display, in response to detecting that a display condition of the second image is satisfied, the second image in the image display area.

In a third aspect, an example of the disclosure further provides an electronic device. The electronic device includes: a processor; and a storage apparatus configured to store a program. When the program is executed by the processor, the processor is caused to implement the image display method according to any one of the examples of the disclosure.

In a fourth aspect, an example of the disclosure further provides a computer-readable storage medium. The computer-readable storage medium stores a computer program. When the computer program implements the image display method according to any one of the examples of the disclosure when being executed by a processor.

DETAILED DESCRIPTION OF EMBODIMENTS

Examples of the disclosure will be described below with reference to the accompanying drawings. Although some examples of the disclosure are shown in the accompanying drawings, it should be understood that the disclosure may be implemented in various forms, and the examples are provided for a more thorough and complete understanding of the disclosure. It should be understood that the drawings and the examples of the disclosure are only for illustrative purposes.

It should be understood that a plurality of steps described in method embodiments of the disclosure may be executed in a different order and/or in parallel. Further, the method embodiments may include additional steps and/or omit execution of the illustrated steps, The terms "include" and "comprise" used herein and their variations are open-ended, that is, "include but not limited to" and "comprise but not limited to". The term "on the basis of" means "at least partly on the basis of". The term "an example" means "at least one example". The term "another example" means "at least another example". The term "some examples" means "at least some examples". Related definitions of other terms will be given in the following description.

It should be noted that concepts such as "first" and "second" mentioned in the disclosure are only used to distinguish different apparatuses, modules or units. It should be noted that modification of "a", "an" or "a plurality of" mentioned in the disclosure is illustrative, and should be understood by those skilled in the art as "one or more" unless explicitly stated otherwise in the context.

Names of messages or information exchanged between a plurality of apparatuses in the embodiment of the disclosure are only for illustrative purposes.

Embodiment 1

Figure 1:
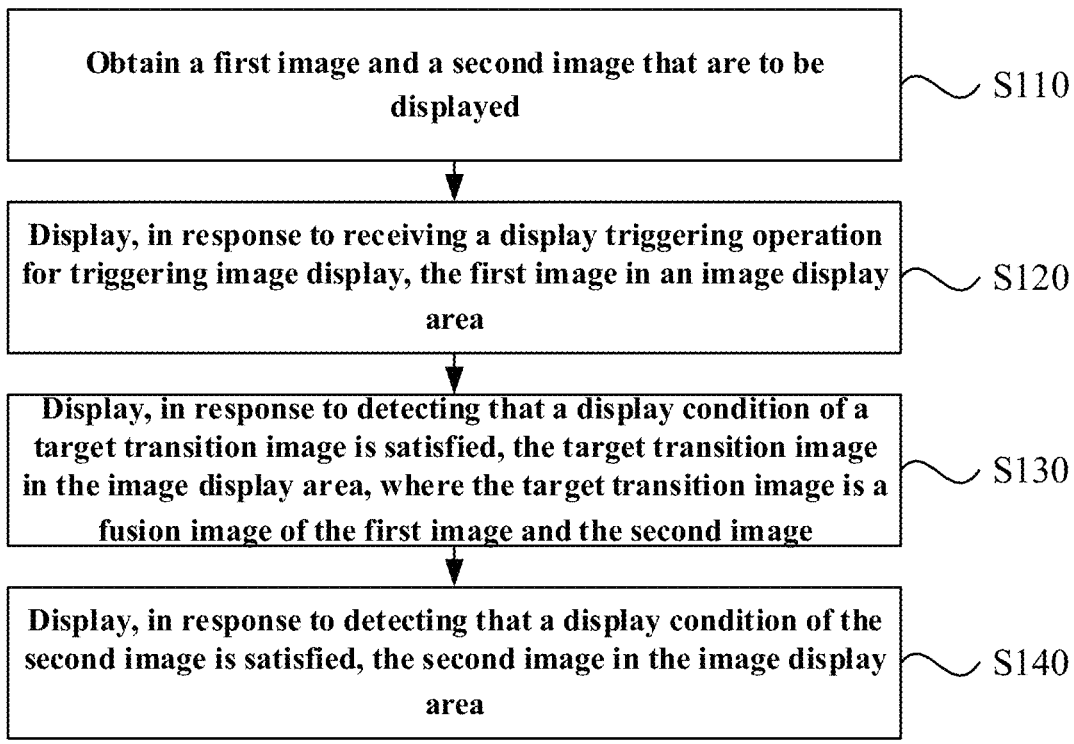
FIG. 1 is a schematic flow diagram of an image display method according to Embodiment 1 of the disclosure.

FIG. 1 is a schematic flow diagram of an image display method according to Embodiment 1 of the disclosure. The example is suitable for a case of displaying a plurality of images. The method may be executed by an image display apparatus. The apparatus may be implemented by means of software and/or hardware, and optionally, may be implemented by an electronic device. The electronic device may be a mobile terminal, a personal computer (PC) terminal, a server, etc. Any image display scene is generally implemented through cooperation of a client and a server. The method according to the example may be executed by the server or the client, or through cooperation of the client and the server.

As shown in FIG. 1, the method according to this embodiment may include the following:

S110. A first image and a second image that are to be displayed are obtained.

In this embodiment, the first image and the second image may be understood as two to-be-displayed images. Considering that an image display order exists when two or more images are displayed, the first image may be understood as an image displayed firstly when the first image and the second image are displayed in the embodiments of the disclosure, and the second image may be understood as an image displayed later when the first image and the second image are displayed. The image display order may be determined according to a time sequence of image uploading or a position of image uploading.

It may be understood that the first image and the second image may have the same or different content. For instance, the first image and the second image may be a person image, an animal image, a landscape image, an object image, a cartoon image, etc. In the embodiments of the disclosure, parameters such as sizes, formats, obtaining modes and obtaining orders of the first image and the second image may be set according to actual needs.

In order to ensure that the first image and the second image achieve an expected display effect, optionally, a target image feature of at least one of the first image and the second image may be preset. For instance, it may be preset that the first image needs to include a target object. With the first image as an instance, for instance, the first image may be set as a person image, and includes target parts of a person, such as a face, shoulders or limbs.

The first image and the second image that are to be displayed may be obtained in a plurality of modes. Optionally, the first image and the second image that are to be displayed are received, which are uploaded by a user. For instance, a first image added by the user at a first preset image addition position and a second image added by the user at a second preset image addition position may be received. Optionally, the first image and the second image are collected by a photographing apparatus, and the collected first image and second image are used as the first image and the second image that are to be displayed.

S120. In response to receiving a display triggering operation for triggering image display, the first image is displayed in an image display area.

In the example, the display triggering operation may be understood as an operation for triggering start of displaying the first image and the second image. The display triggering operation has a plurality of triggering modes, and for instance, may be generated through voice, a gesture, a preset time condition, a preset display triggering control, etc. The preset display triggering control may be a virtual identifier configured on a software interface. Triggering of the preset display triggering control may indicate start and image display in a preset mode. For instance, the display triggering operation for triggering image display may be received through at least one of the following operations: voice information including a target keyword is received; preset gesture information is collected; a clicking or pressing operation input for a preset display control is received; it is detected that the first image and the second image are obtained; the first image is recognized to be an image of a first preset type; and the first image is recognized to be an image of a second preset type. A first preset image type and a second preset image type may be the same or different. It should be noted that "first" and "second" in the "first preset image type" and the "second preset image type" are used to distinguish preset image types in different image recognition scenes. The preset image type may be set according to at least one of an image format and an image content.

For instance, the first image may be recognized to be the image of the first preset type as follows: the first image is recognized to be the image of the first preset type in response to detecting that the first image includes a target object having a first target attribute. Similarly, the second image may be recognized to be the image of the second preset type as follows: the second image is recognized to be the image of the second preset type in response to detecting that the second image includes a target object having a second target attribute. A first target object and a second target object may be the same as or different. For instance, a first target attribute or a second target attribute may be an object type, a scene type, etc. The object types may include buildings, fruits, animals, or human faces. The scene types may include landscapes or weathers. For instance, in response to recognizing that the first image and the second image include human face areas, it may be determined that the display triggering operation for triggering image display is received.

Optionally, displaying the first image in the image display area includes the following: the first image is statically displayed in the image display area, or the first image is dynamically displayed in the image display area. The first image may be dynamically displayed in the image display area as follows: the first image is dynamically displayed in the image display area in a flickering, enlarged, or moving manner.

S130. In response to detecting that a display condition of a target transition image is satisfied, the target transition image is displayed in the image display area. The target transition image is a fusion image of the first image and the second image.

In the example, the target transition image may be understood as a transitional image during the first image is switched to the second image for displaying. The display condition of the target transition image may be understood as a condition configured to trigger to start to display a transition image. The display condition of the target transition image may be set according to actual needs.

Optionally, the display condition of the target transition image may include at least one of the following conditions:

a ratio of display progress of the first image to a total display duration of the first image, the target transition image and the second image reaches a preset ratio threshold;

a total display duration of the first image reaches a preset first image total display duration threshold;

a display effect of the first image reaches a preset display effect;

a display size of the first image reaches a preset display size threshold;

a static display duration of the first image being statically displayed reaches a preset static display duration threshold; and a dynamic display duration of the first image being dynamically displayed reaches a preset dynamic display duration threshold.

In response to detecting that the display condition of the target transition image is satisfied, the target transition image may be generated according to the first image and the second image, and then the target transition image may be displayed in the image display area. The solution is especially suitable for a scene where the first image and the second image are flexibly configured. The solution may conduct image fusion on the first image and the second image in an image display process, and generate the target transition image corresponding to the first image and the second image, so as to implement smooth transition from display of the second image to display of the second image.

Optionally, the target transition image is obtained by fusing a local image of the first image and the second image, or by fusing a local image of the first image and a local image of the second image. For instance, the target transition image is obtained by fusing an area display image displayed by the first image enlarged in the image display area and the second image. A display size of the second image may be less than or equal to a display size of the area display image.

In the embodiments of the disclosure, a number of target transition images may be one, two or more. When two or more target transition images need to be displayed, displaying the target transition images in the image display area may include the following: two or more target transition images are sequentially displayed in the image display area. A first target transition image is obtained by fusing the first image and the second image. A target transition image after the first target transition image is obtained by fusing a previous displayed target transition image and the second image.

Optionally, in response to detecting that a display condition of a first transition image is satisfied, an area display image displayed by the first image in the image display area is obtained, and the first target transition image is generated according to the area display image and the second image; in response to detecting that a display condition of a second transition image is satisfied, a second target transition image is generated according to the first target transition image and the second image; in response to detecting that a display condition of a third transition image is satisfied, a third target transition image is generated according to the second target transition image and the second image; and the rest may be processed in a similar way. That is, when the target transition image needs to be generated, the target transition image is generated according to image information displayed in the image display area and the second image.

Similarly, displaying the target transition image in the image display area includes the following: the target transition image is statically displayed in the image display area, or the target transition image is dynamically displayed in the image display area. The target transition image may be dynamically displayed in the image display area as follows: the target transition image is dynamically displayed in the image display area in a flickering, enlarged, or moving manner.

S140. In response to detecting that a display condition of the second image is satisfied, the second image is displayed in the image display area.

In the example, the display condition of the second image may be understood as a condition configured to trigger to start to display the second image. The display condition of the second image may be set according to actual needs. For instance, the display condition of the second image may include at least one of the following conditions: a transitional display duration of the target transition image reaches a preset transitional display duration; a display frame number of the target transition image reaches a preset display frame number threshold; and an image size of the second image reaches a preset display size.

Similarly, displaying the second image in the image display area may include the following: the second image is statically displayed in the image display area, or the second image is dynamically displayed in the image display area. The second image may be dynamically displayed in the image display area as follows: the second image is dynamically displayed in the image display area in a flickering, enlarged, or moving manner. In order to adapt to the image display area, when the second image is dynamically enlarged and displayed in the image display area, the second image may be gradually enlarged from a size less than the original size of the second image to the original size of the second image, or enlarged to cover the entire image display area in a display process.

In order to achieve smooth transition of the target transition image and the second image in the display process, the target transition image may be faded out of the image display area, and the second image may be faded into the image display area. For instance, the displaying the second image in the image display area may include the following: the target transition image and the second image are superposed and displayed in the image display area. Transparency of the target transition image changes from high to low, and transparency of the second image changes from low to high. For instance, in response to detecting that the display condition of the second image is satisfied, the second image may be displayed by gradually adjusting the transparency of the target transition image from 100% to 0%, and adjusting the transparency of the second image from 0% to 100%.

It may be understood that the displayed target transition image superposed with the second image is a final target transition image, or a target transition image adjacent to the second image.

It should be noted that the image display method according to the embodiments of the disclosure is introduced with two to-be-displayed images as an instance. A number of to-be-displayed images in image display may be set according to actual needs. The method of the example of the disclosure is suitable for a case of displaying three or more images.

Optionally, according to a preset display order corresponding to each image, every two images having adjacent display orders among three or more to-be-displayed images may be classified into a group of to-be-displayed images. Each group of to-be-displayed images includes a first image and a second image. For each group of to-be-displayed images, an image ranking first in each group of two images may be used as the first image, and an image ranking second in each group of two images may be used as the second image. Then, the first image and the second image may be displayed through the image display method according to the example of the disclosure.

Optionally, when all to-be-displayed images are displayed for the first time, a final to-be-displayed image may be used as the first image and a first to-be-displayed image may be used as the second image. Then, the first image and the second image may be displayed through the image display method according to the example of the disclosure, such that cyclic display of all the to-be-displayed images is implemented.

For instance, if a number of to-be-displayed images is four and the four images are expressed as image A, image B, image C, and image D, respectively and have a display order of image A, image C, image D and image B, the image A and the image C may be used as a group of to-be-displayed images, where the image A is a first image of the group of to-be-displayed images, and the image C is a second image of the group of to-be-displayed images; the image C and the image D may be used as a group of to-be-displayed images, where the image C is a first image of the group of to-be-displayed images, and the image D is a second image of the group of to-be-displayed images; the image D and the image B may be used as a group of to-be-displayed images, where the image D is a first image of the group of to-be-displayed images, and the image B is a second image of the group of to-be-displayed images; and the image B and the image A may be used as a group of to-be-displayed images, where the image B is a first image of the group of to-be-displayed images, and the image A is a second image of the group of to-be-displayed images. For each group of to-be-displayed images, the image display method according to the embodiments of the disclosure is separately executed to display the first image and the second image, such that a technical effect of sequentially displaying the image A, the image C, the image D, the image B and then back to the image A can be achieved, and cyclic display of the four images can be implemented.

It should be noted that the target transition image corresponding to the first image and the second image may further be displayed between the first image and the second image, such that smooth transition of the first image and the second image may be implemented. Reference may be made to explanation of the example of the disclosure for details of a generation method for the target transition image, which will not be repeated herein.

According to this embodiment, the first image and the second image that are to be displayed are obtained, and in response to receiving the display triggering operation for triggering image display, the first image is displayed in the image display area, such that image display can be simply triggered after the first image and the second image are obtained, and the first image can be displayed firstly. In response to detecting that the display condition of the target transition image is satisfied, the target transition image is displayed in the image display area before the second image is displayed. Then, in response to detecting that the display condition of the second image is satisfied, the second image is displayed in the image display area. In the related art, only images obtained are displayed. Compared with the related art, transition from the first image to the second image is performed by means of the target transition image because the target transition image is the fusion image of the first image and the second image, such that smooth transition from the first image to the second image is implemented, and therefore, problems that display of the images is simple but less in richness and interestingness when a plurality of images are displayed are solved, a transition effect is enriched, image display becomes more interesting, and user experience is improved.

Embodiment 2

Figure 2:
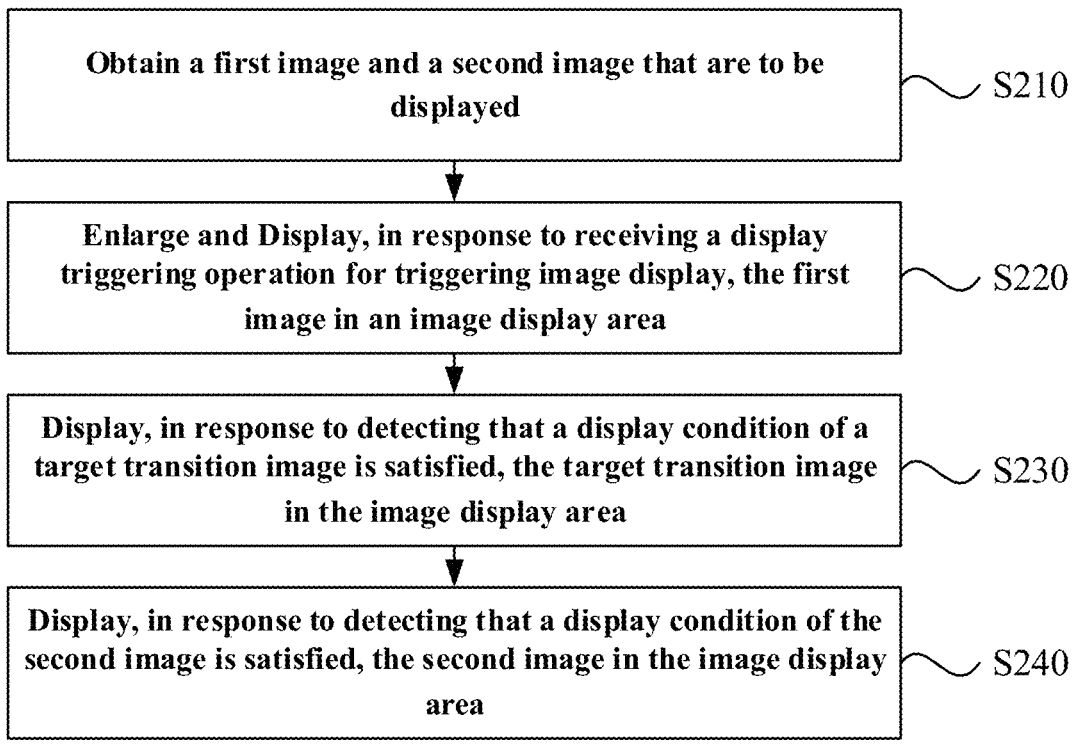
FIG. 2 is a schematic flow diagram of an image display method according to Embodiment 2 of the disclosure.

FIG. 2 is a schematic flow diagram of an image display method according to Embodiment 2 of the disclosure. According to this embodiment, on the basis of any one of the optional solutions in the embodiments of the disclosure, optionally, displaying the first image in the image display area includes the following: the first image is enlarged and displayed in the image display area. Technical terms the same as or corresponding to the above embodiment are not repeated herein.

As shown in FIG. 2, the method of this embodiment may include the following:

S210. A first image and a second image that are to be displayed are obtained.

S220. In response to receiving a display triggering operation for triggering image display, the first image is enlarged and displayed in an image display area.

The first image may be enlarged and displayed in the image display area in various modes. Optionally, the first image is enlarged and displayed in the image display area according to a preset enlargement ratio. For instance, the first image may be gradually enlarged and displayed in the image display area as follows: the first image is gradually enlarged and displayed in the image display area according to a preset enlargement ratio and a preset enlargement speed, or the first image is gradually enlarged and displayed in the image display area according to a preset enlargement ratio and a preset enlargement time point.

For instance, the first image may be enlarged and displayed in the image display area as follows: the first image is enlarged and displayed according to a target enlargement area of the first image, and the target enlargement area is displayed in the image display area. The target enlargement area may be an area including a target object. For instance, if the first image is an image including a human face, the target enlargement area may be an eye area, a temple area, an area between eyebrows, a mouth area, etc.

Optionally, enlarging and displaying the first image according to the target enlargement area of the first image may include the following: the first image is recognized according to area feature information of the target enlargement area, the target enlargement area of the first image is obtained, an enlargement reference point of the target enlargement area is determined, and the first image is enlarged according to the enlargement reference point, such that the target enlargement area is displayed in the image display area. The enlargement reference point may be a pixel point at a center of the target enlargement area.

S230. In response to detecting that a display condition of a target transition image is satisfied, the target transition image is displayed in the image display area. The target transition image is a fusion image of the first image and the second image.

Optionally, when the first image is enlarged and displayed, the display condition of the target transition image may further include the following condition: an enlargement display duration for the first image being enlarged and displayed reaches a preset enlargement display duration threshold.

S240. In response to detecting that a display condition of the second image is satisfied, the second image is displayed in the image display area.

In this embodiment, in response to receiving the display triggering operation for triggering image display, the first image is enlarged and displayed in the image display area, such that the first image may present a dynamic display effect, and local information of the first image may be associated with the second image. In this way, not only smooth transition from the first image to the second image can be implemented, but also a visual effect of the second image appearing from a local area of the first image can be shown, and therefore a transition effect in an image display process becomes richer and more interesting, and user experience is improved.

Embodiment 3

Figure 3:
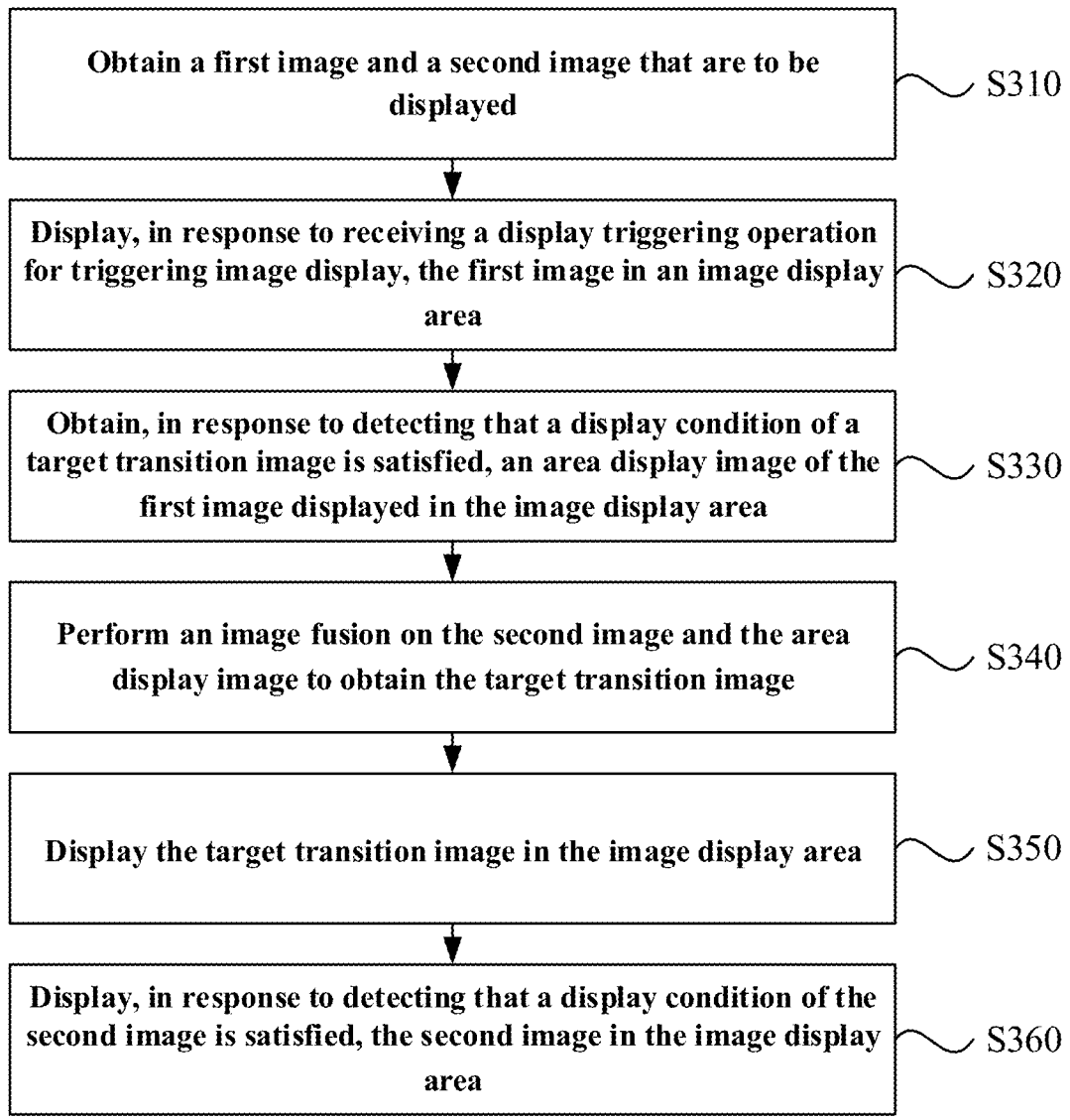
FIG. 3 is a schematic flow diagram of an image display method according to Embodiment 3 of the disclosure.

FIG. 3 is a schematic flow diagram of an image display method according to Embodiment 3 of the disclosure. According to the example, on the basis of any one of the optional solutions in the embodiments of the disclosure, optionally, after it is detected that a display condition of a target transition image is satisfied, and before the target transition image is displayed in an image display area, the method further includes the following: an area display image of a first image displayed in the image display area is obtained, where a display size of a second image is less than a display size of the area display image; and an image fusion is performed on the second image and the area display image to obtain the target transition image.

Technical terms the same as or corresponding to the above example are not repeated herein.

As shown in FIG. 3, the method of this embodiment may include the following:

S310. A first image and a second image that are to be displayed are obtained.

S320. In response to receiving a display triggering operation for triggering image display, the first image is displayed in an image display area.

S330. In response to detecting that a display condition of a target transition image is satisfied, an area display image of the first image displayed in the image display area is obtained, where a display size of the second image is less than a display size of the area display image.

In this embodiment, before the area display image of the first image is obtained displayed in the image display area, the method further includes the following: the first image is gradually enlarged from an original size of the first image, and the second image is gradually enlarged from a preset size. The preset size is less than an original size of the second image. It should be noted that a value of the preset size may be set according to an expected display effect such as a display duration.

Optionally, when the first image is displayed, canvas information of the image display area is generated according to image information of the first image. For instance, resolution of the first image may be used as resolution of a canvas, that is, a number of pixel points of the canvas may be consistent with a number of pixel points of the first image. The setting has advantages that the first image is gradually enlarged from the original size of the first image, such that the first image may cover the whole image display area from the beginning of display all the time, and display of the first image in a manner of gradual enlargement may be more visually impactful.

The second image is gradually enlarged from a preset size less than the display size of the area display image, which may achieve a dynamic display effect of gradually displaying the second image to the image display area from display of the target transition image. A moment when the second image starts to be enlarged may be determined as follows: the second image is gradually enlarged from the preset size in response to receiving the display triggering operation for triggering image display, or the second image is gradually enlarged from the preset size in response to detecting that the display condition of the target transition image is satisfied.

It is considered that the first image and the second image may be displayed in various modes in the image display area. In order to ensure that the target transition image may play a good linking role between display of the first image and display of the second image, an area display image of the first image displayed in the image display area at a current moment and a second image at the current moment may be obtained in response to detecting that the display condition of the target transition image is satisfied. The target transition image is generated according to states of an image displayed in real time in the image display area and the second image at the current moment, such that consistency of perception can be maintained, and smooth transition of the first image and the second image in visual experience can be implemented.

S340. An image fusion is performed on the second image and the area display image, and the target transition image is obtained.

In this embodiment, the image fusion may be performed on the second image and the area display image in various modes. For instance, the first image and the second image may be fused through Poisson fusion. However, considering that Poisson fusion involves equation solving, requires a large amount of computation and takes a long time, the Poisson fusion generally depends on computation of a central processing unit. Due to performance of a graphics processing unit (GPU), an equation generally cannot be solved quickly and effectively, and the image fusion may be impossible. Alternatively, the first image and the second image may be fused through Jacobian iteration. The Jacobian iteration aims at approaching a real result, takes a long time, and has low image fusion efficiency. In this embodiment of the disclosure, the first image and the second image may be fused according to the gradient value of each pixel point displayed in the image display area. Each pixel point in the image display area may be understood as a pixel point corresponding to a canvas configured to display a target mixed image.

S350. The target transition image is displayed in the image display area.

S360. In response to detecting that a display condition of the second image is satisfied, the second image is displayed in the image display area.

In this embodiment, in response to detecting that the display condition of the target transition image is satisfied, the area display image of the first image displayed in the image display area is obtained. The display size of the second image is less than the display size of the area display image. In this way, the second image may be completely integrated into the area display image, and part of information of the area display image may be retained, such that the second image and the area display image may be fused to obtain the target transition image. Visual transition from the first image to the second image can be achieved, and user experience can be improved.

Embodiment 4

Figure 4:
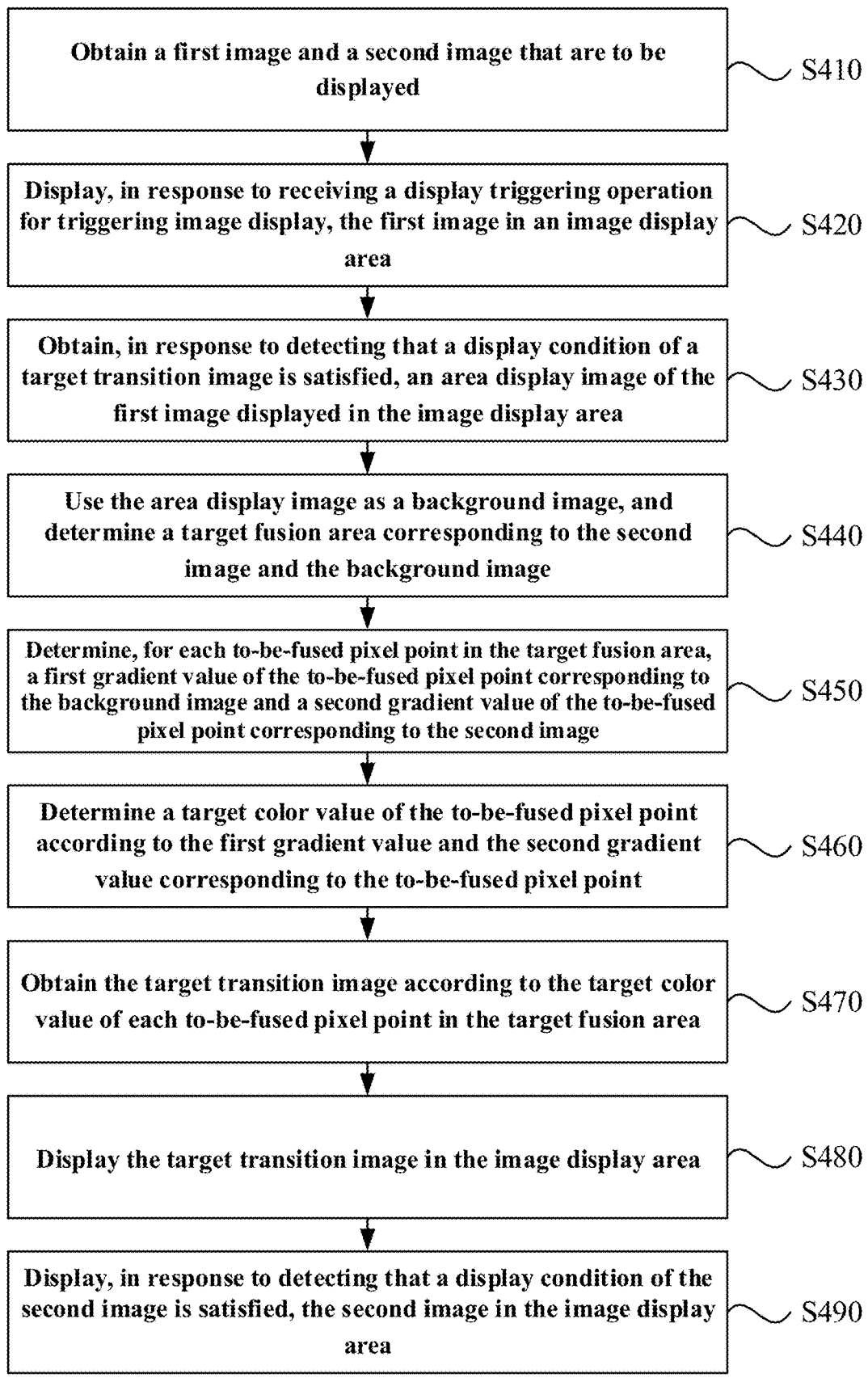
FIG. 4 is a schematic flow diagram of an image display method according to Embodiment 4 of the disclosure.

FIG. 4 is a schematic flow diagram of an image display method according to Embodiment 4 of the disclosure. According to the solution of this embodiment, on the basis of any one of the optional solutions in the embodiments of the disclosure, optionally, performing the image fusion on the second image and the area display image to obtain the target transition image includes the following: the area display image is used as a background image, and a target fusion area corresponding to the second image and the background image is determined; for each to-be-fused pixel point in the target fusion area, a first gradient value of the to-be-fused pixel point corresponding to the background image and a second gradient value of the to-be-fused pixel point corresponding to the second image are determined; a target color value of the to-be-fused pixel point is determined according to the first gradient value and the second gradient value corresponding to the to-be-fused pixel point; and the target transition image is obtained according to the target color value of each to-be-fused pixel point in the target fusion area.

Technical terms the same as or corresponding to the above embodiments are not repeated herein.

As shown in FIG. 4, the method of this embodiment may include the following:

S410. A first image and a second image that are to be displayed are obtained.

S420. In response to receiving a display triggering operation for triggering image display, the first image is displayed in an image display area.

S430. In response to detecting that a display condition of a target transition image is satisfied, an area display image of the first image displayed in the image display area is obtained. A display size of the second image is less than a display size of the area display image.

S440. The area display image is used as a background image, and a target fusion area corresponding to the second image and the background image is determined.

In this embodiment, when the second image and the area display image are fused, the area display image may be used as the background image, and further, the second image may be fused into an entire or partial image area of the area display image. That is, the target fusion area may be an entire or partial image area of the area display image.

Optionally, determining that the target fusion area corresponding to the second image and the background image may include the following: a display area corresponding to the area display image is determined as a target fusion area corresponding to the second image and the area display image; or, a target display area, in the first image, of the second image is determined as a target fusion area corresponding to the second image and the area display image.

In practical application, the target fusion area corresponding to the second image and the background image may be adjusted by adjusting the display size of the second image.

S450. For each to-be-fused pixel point in the target fusion area, a first gradient value of the to-be-fused pixel point corresponding to the background image and a second gradient value of the to-be-fused pixel point corresponding to the second image.

In this embodiment, a gradient value is configured to indicate a speed of color change of a pixel point. In this embodiment of the disclosure, the gradient value of the to-be-fused pixel point may be determined according to the background image and the second image, and then the background image and the second image may be fused according to the gradient value of the to-be-fused pixel point. Compared with image fusion modes such as Poisson fusion and Jacobian iteration, the image fusion with a gradient value has less computation and lower hardware requirements, and may quickly obtain a fusion image, which is especially suitable for a case of processing graphics fusion with a GPU in real time. A gradient value of a pixel point may be computed according to a color value of a neighboring pixel point of the pixel point.

Determining, for each to-be-fused pixel point in the target fusion area, the first gradient value of the to-be-fused pixel point corresponding to the background image and the second gradient value of the to-be-fused pixel point corresponding to the second image may include the following: the first gradient value of the to-be-fused pixel point is determined according to a color value of each pixel point in the background image, and the second gradient value of the to-be-fused pixel point is determined according to a color value of each pixel point in the second image.

It should be noted that the gradient value of the to-be-fused pixel point needs to be computed according to a domain pixel point of the to-be-fused pixel point. In this embodiment of the disclosure, the domain pixel point corresponding to the to-be-fused pixel point may be determined through a preset gradient sampling step. An image fusion effect may change with change of the preset gradient sampling step. Optionally, the preset gradient sampling step may be set with a distance from a center of a pixel point to a center of a pixel point adjacent to the pixel point as a basic unit, that is, with a point distance as a basic unit of the preset gradient sampling step.

For instance, determining the first gradient value of the to-be-fused pixel point according to a color value of each pixel point in the first image includes the following: a target gradient sampling step corresponding to the to-be-fused pixel point is determined, where the target gradient sampling step is configured to indicate a target distance between a to-be-determined reference pixel point and the to-be-fused pixel point; a reference pixel point corresponding to the to-be-fused pixel point in the first image is determined according to position information of the to-be-fused pixel point in the image display area, the target gradient sampling step, and a preset gradient computation direction; and the second gradient value of the to-be-fused pixel point is determined according to a color value of the reference pixel point in the first image.

In this embodiment, the target gradient sampling step may be understood as a parameter configured to determine the reference pixel point corresponding to the to-be-fused pixel point, and the reference pixel point and the to-be-fused pixel point are spaced by the target distance. When only one target transition image needs to be generated, only one preset gradient sampling step may be set, and the preset gradient sampling step may be used as the target gradient sampling step of the to-be-fused pixel point. When two or more target transition images need to be generated, different preset gradient sampling steps may be set for all the target transition images, respectively. In this case, the preset gradient sampling step corresponding to the target transition image needs to be determined as the target gradient sampling step configured to generate the to-be-fused pixel point of the target transition image. It should be noted that data such as a number and change values of a plurality of preset gradient sampling steps may be set according to actual needs. For instance, the preset gradient sampling step may be changed from a 0-time point distance to a 2-time point distance. In order to achieve a gradual effect of an image display effect, a plurality of preset gradient sampling steps may be set and gradually change from small to large. In an example, the preset gradient sampling step may be adjusted by setting an adjustment progress bar configured to adjust a gradient sampling step. A linear change relation may be presented between the plurality of preset gradient sampling steps. With reference to the above examples, a plurality of intermediate multiple point distances may be set between the 0-time point distance and the 2-time point distance with 0.2-time point distance as a growth value.

On the basis of the above technical solution, the display condition of the target transition image may further include the following condition: a preset gradient sampling step corresponding to the target transition image changes, where the preset gradient sampling step is configured to measure a distance between two pixel points in the target transition image. In tis embodiment of the disclosure, the condition that the preset gradient sampling step corresponding to the target transition image changes may be understood as the condition that a gradient sampling step changes from one preset value to another preset value.

Similarly, determining the second gradient value of the to-be-fused pixel point according to a color value of each pixel point in the second image includes the following: a target gradient sampling step corresponding to the to-be-fused pixel point is determined, where the target gradient sampling step is configured to indicate a target distance between a to-be-determined reference pixel point and the to-be-fused pixel point; a reference pixel point in the second image corresponding to the to-be-fused pixel point is determined according to position information of the to-be-fused pixel point in the image display area, the target gradient sampling step, and a preset gradient computation direction; and the second gradient value of the to-be-fused pixel point is determined according to a color value of the reference pixel point in the second image.

In order to improve image fusion efficiency, the first gradient value of each to-be-fused pixel point corresponding to the background image and the second gradient value of each to-be-fused pixel point corresponding to the second image may be computed in parallel. After the first gradient values and the second gradient values of all to-be-fused pixel points in the target fusion area are completely computed, a first gradient map corresponding to the background image and a second gradient map corresponding to the second image may be obtained for later query.

S460. A target color value of the to-be-fused pixel point is determined according to the first gradient value and the second gradient value corresponding to the to-be-fused pixel point.

In this embodiment, the color value may be understood as a value of each color channel. For a red-green-blue (RGB) image, a color value may be understood as values of three RGB channels. The target color value of the to-be-fused pixel point may be understood as a color value to be presented by the to-be-fused pixel point.

Optionally, a color value corresponding to a greater one of the first gradient value and the second gradient value corresponding to the to-be-fused pixel point is selected as the target color value of the to-be-fused pixel point. For instance, the first gradient value and the second gradient value corresponding to the to-be-fused pixel point are compared, such that the greater one of the first gradient value and the second gradient value is determined. In response to determining that the greater one is the first gradient value, the color value of the pixel point corresponding to the to-be-fused pixel point in the background image is determined as the target color value of the to-be-fused pixel point. In response to determining that the greater one is the second gradient value, the color value of the pixel point corresponding to the to-be-fused pixel point in the second image is determined as the target color value of the to-be-fused pixel point.

Optionally, a first weight value of the color value corresponding to the first gradient value and a second weight value of the color value corresponding to the second gradient value may be determined according to magnitudes of the first gradient value and the second gradient value corresponding to the to-be-fused pixel point, respectively, and then the target color value of the to-be-fused pixel point may be computed according to the color value corresponding to the first gradient value, the first weight value, the color value corresponding to the second gradient value and the second weight value of the to-be-fused pixel point.

S470. The target transition image is obtained according to the target color value of each to-be-fused pixel point in the target fusion area.

In this embodiment of the disclosure, a transition image obtained through one time of computation may be used as the target transition image, or the target transition image may be determined through two or more iterations, such that a fusion effect of the target transition image may be improved. When the target transition image is determined through two or more iterations, an intermediate transition image may be generated according to the target color value of each to-be-fused pixel point in the target fusion area. Then the intermediate transition image and the second image are fused to update the intermediate transition image, the step of fusing the intermediate transition image and the second image is executed repeatedly, such that the target transition image is obtained.

For instance, an intermediate transition image is obtained according to the target color value of each to-be-fused pixel point in the target fusion area; the intermediate transition image is used as a background image, and an operation of determining the target fusion area corresponding to the second image and the background image, determining, for each to-be-fused pixel point in the target fusion area, the first gradient value of the to-be-fused pixel point corresponding to the background image and the second gradient value of the to-be-fused pixel point corresponding to the second image, determining a target color value of the to-be-fused pixel point according to the first gradient value and the second gradient value corresponding to the to-be-fused pixel point, and obtaining the intermediate transition image according to the target color value of each to-be-fused pixel point in the target fusion area are repeatedly executed; and in response to detecting that a fusion ending condition is satisfied, the intermediate transition image is used as the target transition image.

In this embodiment, when the intermediate transition image is obtained according to the target color value of each to-be-fused pixel point in the target fusion area, the intermediate transition image may be obtained through off-screen rendering according to the target color value of each to-be-fused pixel point in the target fusion area. An off-screen rendering mode may be understood as rendering the intermediate transition image into a preset cache area. Optionally, the intermediate transition image is not displayed in the image display area.

It should be noted that the fusion ending condition may be set according to actual needs, and may be, for instance, a condition that a preset iteration number is satisfied, or a condition that a fused image parameter reaches a preset parameter threshold. The preset iteration number represents a transition image computation frequency required by the target transition image, and a value of the preset iteration number may be set according to an expected image fusion effect, and for instance, may be 5 times, 6 times, or 8 times.

S480. The target transition image is displayed in the image display area.

S490. In response to detecting that a display condition of the second image is satisfied, the second image is displayed in the image display area.

In the example, the area display image is used as the background image, and the second image is fused into the background image. Firstly, the target fusion area corresponding to the second image and the background image is determined, and each to-be-fused pixel point in the target fusion area is processed. The target color value of the to-be-fused pixel point is determined according to the determined first gradient value corresponding to the background image and the determined second gradient value corresponding to the second image of the to-be-fused pixel point. Then, according to the target color value of each to-be-fused pixel point in the target fusion area, the target transition image is obtained. Because the image fusion mode has low requirements for hardware support and a high computation speed, the target transition image can be generated in real time in a process of displaying the first image and the second image, and fusion efficiency of the second image and the background image can be effectively improved.

Embodiment 5

This embodiment will introduce an image display method according to the embodiments of the disclosure in combination with a specific application scene. In the application scene, a first image and a second image are images including eye areas, and an expected visual display effect of the first image and the second image is that the second image appears when the first image is enlarged to the eye area, and the second image is gradually enlarged and clearly displayed. An implementation mode is as follows:

A first image and a second image that are to be displayed are obtained.

An eye area in the first image is used as an area display image of the first image in an image display area, and the first image is enlarged and displayed, that is, the first image is enlarged and displayed with the eye area in the first image as a center.

The second image is gradually enlarged from a preset size less than an original size of the second image to the original size of the second image.

In response to detecting that a display condition of a target transition image is satisfied, image information of an eye area displayed in the image display area at a current moment is obtained as image information of a background image, a second image at a current moment is obtained, image fusion is performed on the background image and the second image, and the target transition image is obtained and displayed.

When a plurality of target transition images need to be displayed, a previous target transition image displayed in the image display area at the current moment may be obtained as the background image, the second image at the current moment may be obtained, image fusion may be performed on the background image and the second image, and the target transition image may be obtained and displayed.

In response to detecting that a display condition of the second image is satisfied, transparency of the target transition image is adjusted from high to low, and meanwhile, transparency of the second image is adjusted from low to high, such that the second image is displayed in the image display area.

In this embodiment, a pixel point displayed in the image display area is used as a to-be-fused pixel point. For each to-be-fused pixel point, a first gradient value of the to-be-fused pixel point corresponding to the background image and a second gradient value of the to-be-fused pixel point corresponding to the second image are computed. A color value corresponding to a greater one of the first gradient value and the second gradient value is selected as a target color value of the to-be-fused pixel point. According to the target color value of each to-be-fused pixel point, a new image is rendered off-screen as an intermediate transition image. The above operation is executed repeatedly. In response to detecting that a fusion ending condition is satisfied, the intermediate transition image is used as the target transition image.

In the example, in an image display process, fast image fusion may be implemented by means of a graphics processing unit (GPU), and a fusion effect may be obtained within one frame, such that image fusion efficiency can be improved, a transition effect of image display can be enriched, and user experience can be improved.

Embodiment 6

Figure 5:
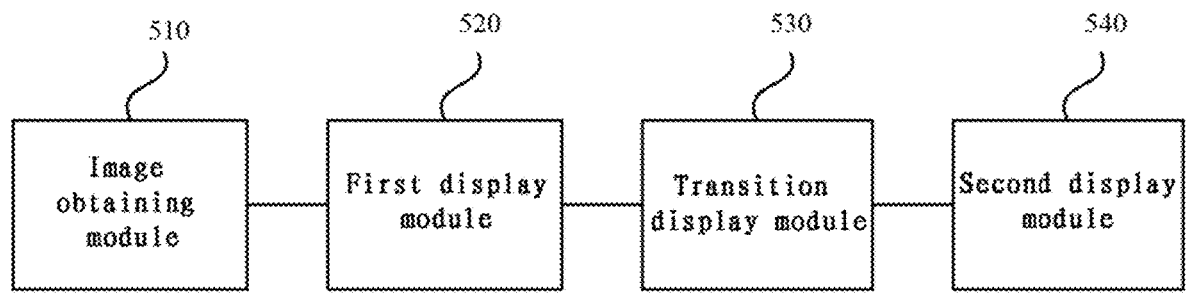
FIG. 5 is a schematic structural diagram of an image display apparatus according to Embodiment 6 of the disclosure.

FIG. 5 is a schematic structural diagram of an image display apparatus according to Embodiment 6 of the disclosure. The image display apparatus according to the embodiments may be implemented by means of software and/or hardware, and may be configured in a terminal and/or a server, so as to implement the image display method according to the embodiments of the disclosure. The apparatus may include: an image obtaining module 510, a first display module 520, a transition display module 530, and a second display module 540.

The image obtaining module 510 is configured to obtain a first image and a second image that are to be displayed. The first display module 520 is configured to display, in response to receiving a display triggering operation for triggering image display, the first image in an image display area. The transition display module 530 is configured to display, in response to detecting that a display condition of a target transition image is satisfied, the target transition image in the image display area, where the target transition image is a fusion image of the first image and the second image. The second display module 540 is configured to display, in response to detecting that a display condition of the second image is satisfied, the second image in the image display area.

According to the example of the disclosure, the first image and the second image that are to be displayed are obtained, and in response to receiving the display triggering operation for triggering image display, the first image is displayed in the image display area, such that image display can be simply triggered after the first image and the second image are obtained, and the first image can be displayed firstly. In response to detecting that the display condition of the target transition image is satisfied, the target transition image is displayed in the image display area before the second image is displayed. Then, in response to detecting that the display condition of the second image is satisfied, the second image is displayed in the image display area. In the related art, only images obtained are displayed. Compared with the related art, the transition from the first image to the second image is performed by means of the target transition image because the target transition image is the fusion image of the first image and the second image, such that smooth transition from the first image to the second image is implemented, and therefore, problems that display of the images is simple but less in richness and interestingness when a plurality of images are displayed are solved, a transition effect is enriched, image display becomes more interesting, and user experience is improved.

On the basis of any one of the optional technical solutions in the embodiments of the disclosure, optionally, the first display module is configured to: enlarge and display the first image in the image display area.

On the basis of any one of the optional technical solutions in the embodiments of the disclosure, optionally, the first display module is configured to: enlarge and display the first image according to a target enlargement area of the first image to display the target enlargement area in the image display area.

On the basis of any one of the optional technical solutions in the embodiments of the disclosure, optionally, the display condition of the target transition image includes at least one of the following conditions that: a ratio of display progress of the first image to total display duration of the first image, the target transition image and the second image reaches a preset ratio threshold; a total display duration of the first image reaches a preset first image total display duration threshold; a display effect of the first image reaches a preset display effect; a display size of the first image reaches a preset display size threshold; a static display duration of the first image being statically displayed reaches a preset static display duration threshold; a dynamic display duration of the first image being dynamically displayed reaches a preset dynamic display duration threshold; and a preset gradient sampling step corresponding to the target transition image changes, where the preset gradient sampling step is configured to measure a distance between pixel points in an image.

On the basis of any one of the optional technical solutions in the embodiments of the disclosure, optionally, the image display apparatus an image further includes: an image determination module and an image fusion module.

The image determination module is configured to obtain, after detecting that the display condition of the target transition image is satisfied and before displaying the target transition image in the image display area, an area display image of the first image displayed in the image display area. A display size of the second image is less than a display size of the area display image. The image fusion module is configured to perform an image fusion on the second image and the area display image to obtain the target transition image.

On the basis of any one of the optional technical solutions in the embodiments of the disclosure, optionally, the image determination module is configured to: gradually enlarge the first image from an original size of the first image, and gradually enlarge the second image from a preset size. The preset size is less than an original size of the second image.

On the basis of any one of the optional technical solutions in the embodiments of the disclosure, optionally, the image fusion module includes: a fusion area determination unit, a gradient value computation unit, a color value determination unit, and a transition image generation unit.

The fusion area determination unit is configured to use the area display image as a background image, and determine a target fusion area corresponding to the second image and the background image. The gradient value computation unit is configured to determine, for each to-be-fused pixel point in the target fusion area, a first gradient value of the to-be-fused pixel point corresponding to the background image and a second gradient value of the to-be-fused pixel point corresponding to the second image. The color value determination unit is configured to determine a target color value of the to-be-fused pixel point according to the first gradient value and the second gradient value corresponding to the to-be-fused pixel point. The transition image generation unit is configured to obtain the target transition image according to the target color value of each to-be-fused pixel point in the target fusion area.

On the basis of any one of the optional technical solutions in the embodiments of the disclosure, optionally, the gradient value computation unit is configured to: determine the first gradient value of the to-be-fused pixel point according to a color value of each pixel point in the background image, and determine the second gradient value of the to-be-fused pixel point according to a color value of each pixel point in the second image.

On the basis of any one of the optional technical solutions in the examples of the disclosure, optionally, the gradient value computation unit is further configured to: determine a target gradient sampling step corresponding to the to-be-fused pixel point, where the target gradient sampling step indicates a target distance between a to-be-determined reference pixel point and the to-be-fused pixel point; determine a reference pixel point in the second image corresponding to the to-be-fused pixel point according to position information of the to-be-fused pixel point in the image display area, the target gradient sampling step, and a preset gradient computation direction; and determine the second gradient value of the to-be-fused pixel point according to a color value of the reference pixel point in the second image.

On the basis of any one of the optional technical solutions in the embodiments of the disclosure, optionally, the color value determination unit is configured to: select a color value corresponding to a greater one of the first gradient value and the second gradient value that are corresponding to the to-be-fused pixel point as the target color value of the to-be-fused pixel point.

On the basis of any one of the optional technical solutions in the embodiments of the disclosure, optionally, the target transition image generation unit is configured to: obtain an intermediate transition image according to the target color value of each to-be-fused pixel point in the target fusion area; use the intermediate transition image as a background image, and repeatedly executing an operation of determining the target fusion area corresponding to the second image and the background image; determine, for each to-be-fused pixel point in the target fusion area, the first gradient value of the to-be-fused pixel point corresponding to the background image and the second gradient value of the to-be-fused pixel point corresponding to the second image, determine the target color value of the to-be-fused pixel point according to the first gradient value and the second gradient value corresponding to the to-be-fused pixel point, and obtain the intermediate transition image according to the target color value of each to-be-fused pixel point in the target fusion area; and use, in response to detecting that a fusion ending condition is satisfied, the intermediate transition image as the target transition image.

On the basis of any one of the optional technical solutions in the embodiments of the disclosure, optionally, the fusion area determination unit is configured to: determine a display area corresponding to the area display image as a target fusion area corresponding to the second image and the area display image; or, determine a target display area of the second image in the first image as a target fusion area corresponding to the second image and the area display image.

On the basis of any one of the optional technical solutions in the embodiments of the disclosure, optionally, the second display module is configured to: superpose and display the target transition image and the second image in the image display area, where transparency of the target transition image changes from high to low, and transparency of the second image changes from low to high.

On the basis of any one of the optional technical solutions in the embodiments of the disclosure, optionally, the display condition of the second image includes at least one of the following conditions that: a transitional display duration of the target transition image reaches preset transitional display duration; a display frame number of the target transition image reaches a preset display frame number threshold; and an image size of the second image reaches a preset display size.

On the basis of any one of the optional technical solutions in the examples of the disclosure, optionally, the transition display module is configured to: sequentially display two or more target transition images in the image display area, where a first target transition image is obtained by fusing the first image and the second image, and a target transition image subsequent to the first target transition image is obtained by fusing a previous displayed target transition image and the second image.

The image display apparatus according to the embodiments of the disclosure may execute the image display method according to any one of the examples of the disclosure, and has corresponding functional modules and beneficial effects corresponding to execution of the method.

It should be noted that a plurality of units and modules included in the apparatus are merely divided according to a functional logic, as long as the corresponding functions may be achieved. In addition, specific names of a plurality of functional units are merely for convenience of mutual distinguishing.

Embodiment 7

Figure 6:
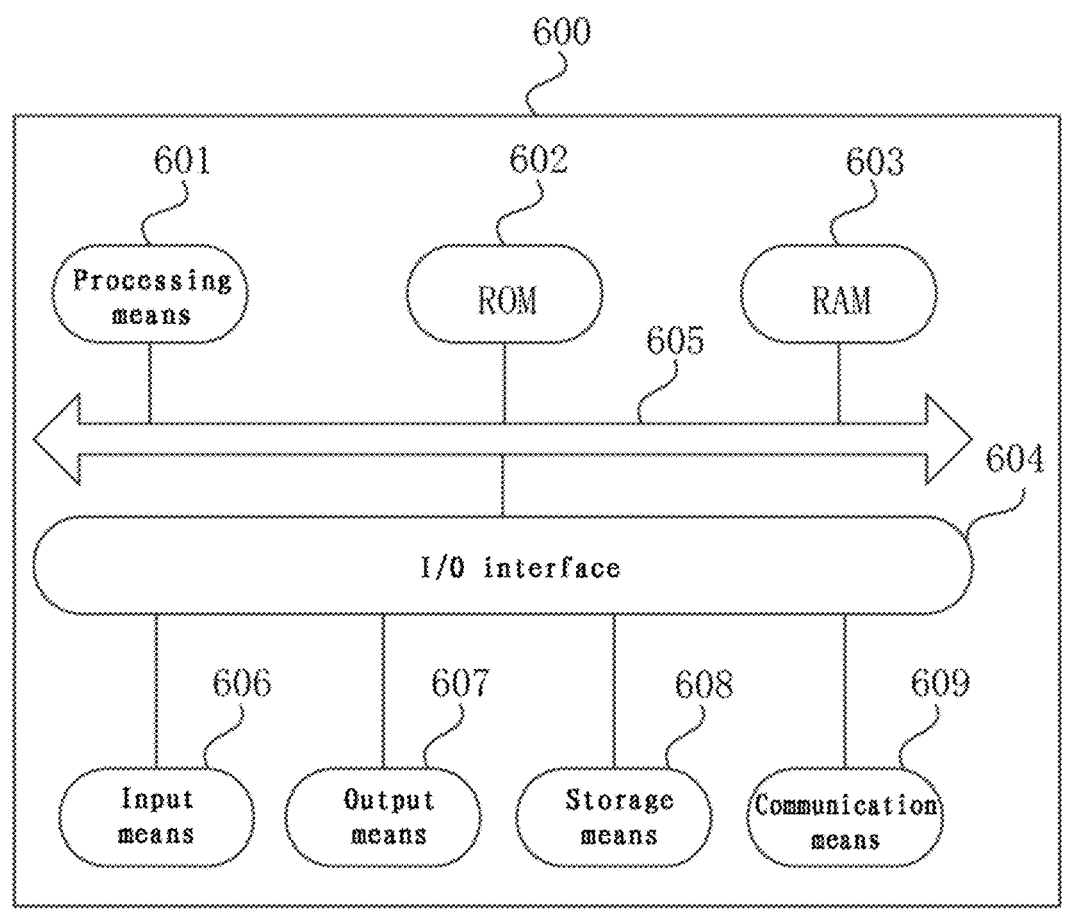
FIG. 6 is a schematic structural diagram of an electronic device according to Embodiment 7 of the disclosure.

FIG. 6 is a schematic structural diagram of an electronic device according to Embodiment 7 of the disclosure. FIG. 6 shows a schematic structural diagram of an electronic device (for instance, a terminal device or a server in FIG. 5) 600 suitable for implementing an embodiment of the disclosure below. The terminal device in the embodiments of the disclosure may be a mobile terminal such as a mobile phone, a notebook computer, a digital broadcast receiver, a personal digital assistant (PDA), a portable android device (PAD), a portable media player (PMP), or a vehicle-mounted terminal (for instance, a vehicle-mounted navigation terminal), and a fixed terminal such as a digital television (TV) or a desktop computer. The electronic device shown in FIG. 5 is only illustrative.

As shown in FIG. 6, the electronic device 500 may include a processing apparatus (for instance, a central processing unit or a graphics processing unit) 601. The electronic device 500 may execute various appropriate actions and processing according to a program stored in a read only memory (ROM) 602 or a program loaded from a storage apparatus 606 to a random access memory (RAM) 603. The RAM 603 further stores various programs and data required for operations of the electronic device 600. The processing apparatus 601, the ROM 602 and the RAM 603 are connected to one another by means of a bus 604. An input/output (I/O) interface 5605 is further connected to the bus 604.

Generally, apparatuses that may be connected to the I/O interface 605 include the following: an editing apparatus 606 including, for instance, a touch screen, a touch pad, a keyboard, a mouse, a camera, a microphone, an accelerometer, a gyroscope, etc.; an output apparatus 607 including, for instance, a liquid crystal display (LCD), a speaker, a vibrator, etc.; the storage apparatus 606 including, for instance, a magnetic tape, a hard disk, etc.; and a communication apparatus 609. The communication apparatus 609 may allow the electronic device 600 to be in wireless or wired communication with other devices so as to achieve data exchange. Although FIG. 6 shows the electronic device 600 including various apparatuses, it should be understood that not all the apparatuses shown are required to be implemented or included. More or fewer apparatuses may be alternatively implemented or included.

Particularly, according to the example of the disclosure, the process described above with reference to the flow diagram may be implemented to be a computer software program. For instance, an embodiment of the disclosure includes a computer program product. The computer program product includes a computer program hosted by a non-transitory computer-readable medium. The computer program includes a program code configured to execute the method shown in the flow diagram. In such an embodiment, the computer program may be downloaded and configured from a network through the communication apparatus 609, or configured from the storage apparatus 606, or configured from the ROM 602. The computer program executes the functions in the method according to the embodiment of the disclosure when being executed by the processing apparatus 601.

Names of messages or information exchanged between a plurality of apparatuses in the embodiment of the disclosure are only for illustrative purposes.

The electronic device according to the example of the disclosure belongs to the same inventive concept as the image display method according to the above examples. Reference may be made to the above examples for technical details not described in detail in the example. The example has the same beneficial effects as the above examples.

Embodiment 7

An embodiment of the disclosure provides a computer storage medium, which stores a computer program. The computer program implements the image display method according to the example when being executed by a processor.

It should be noted that the computer-readable medium described in the disclosure may be a computer-readable signal medium, or a computer-readable storage medium, or any combination thereof. For instance, the computer-readable storage medium may be an electronic, magnetic, optical, electromagnetic, infrared, or semiconductor system, apparatus, or device, or any suitable combination thereof. The computer-readable storage medium may be an electrical connection having on one or more wires, a portable computer disk, a hard disk, a random access memory, a read only memory, an erasable programmable read only memory (EPROM or a flash memory), an optical fiber, a portable compact disk read only memory (CD-ROM), an optical storage device, a magnetic storage device, or any suitable combination thereof. In the disclosure, the computer-readable storage medium may be any tangible medium including or storing a program. The program may be used by or in combination with an instruction execution system, apparatus or device. In the disclosure, the computer-readable signal medium may include a data signal in a baseband or as part of a carrier for transmission, and the data signal carries a computer-readable program code. The transmitted data signal may be in various forms, and may be an electromagnetic signal, an optical signal, or any suitable combination thereof. The computer-readable signal medium may further be any computer-readable medium other than the computer-readable storage medium. The computer-readable signal medium may transmit, propagate or transmit a program used by or in combination with an instruction execution system, apparatus or device. The program code included in the computer-readable medium may be transmitted by any suitable medium including an electric wire, an optical cable, radio frequency (RF), etc., or any suitable combination thereof.

In some embodiments, a client and a server may be in communication with each other with any currently known or future-developed network protocol, for instance, a hypertext transfer protocol (HTTP), and may be interconnected with digital data communication (for instance, a communication network) in any form or medium. Instances of the communication network include a local area network (LAN), a wide area network (WAN), the internet work (for instance, the Internet), an end-to-end network (for instance, an ad hoc end-to-end network), and any currently known or future-developed networks.

The computer-readable medium may be included in the electronic device, or may exist independently without being assembled into the electronic device.

The computer-readable medium carries one or more programs. When the one or more programs are executed by the electronic device, the electronic device is caused to: obtain a first image and a second image that are to be displayed; display, in response to receiving a display triggering operation for triggering image display, the first image in an image display area; display, in response to detecting that a display condition of a target transition image is satisfied, the target transition image in the image display area, where the target transition image is a fusion image of the first image and the second image; and display, in response to detecting that a display condition of the second image is satisfied, the second image in the image display area.

A computer program code configured to execute an operation of the disclosure may be written in one or more programming languages or a combination thereof. The programming languages include object-oriented programming languages such as Java, Smalltalk, and C++, and further include conventional procedural programming languages such as "C" or similar programming languages. The program code may be executed entirely on a user computer, executed partially on a user computer, executed as a stand-alone software package, executed partially on a user computer and partially on a remote computer, or executed entirely on the remote computer or a server. In the case involving the remote computer, the remote computer may be connected to the user computer through any type of networks including the LAN or the WAN, or may be connected to an external computer (for instance, the remote computer is connected through the Internet by an Internet service provider).

The flow diagrams and block diagrams in the accompanying drawings illustrate system structures, functions and operations, which may be achieved according to systems, methods and computer program products in all the examples of the disclosure. In view of that, each block in the flow diagrams or block diagrams may represent a module, a program segment, or part of a code, which includes one or more executable instructions configured to implement specified logic functions. It should further be noted that in some alternative implementations, the functions noted in the blocks may also occur in an order different from that in the accompanying drawings. For instance, the functions represented by two continuous blocks may be actually implemented basically in parallel, or may be implemented in reverse orders, which depends on the involved functions. It should further be noted that each block in the block diagrams and/or flow diagrams and combinations of the blocks in the block diagrams and/or the flow diagrams may be implemented with dedicated hardware-based systems that implement the specified functions or operations, or may be implemented with combinations of dedicated hardware and computer instructions.

The units involved in the examples described in the disclosure may be implemented by software or hardware. For instance, a first obtaining unit may also be described as "a unit obtaining at least two Internet protocol addresses".

The functions described herein may be at least partially executed by one or more hardware logic components. For instance, illustrative types of hardware logic components that may be used include: a field programmable gate array (FPGA), an application specific integrated circuit (ASIC), application specific standard parts (ASSPs), a system on chip (SOC), a complex programmable logic device (CPLD), etc.

In the context of the disclosure, the machine-readable medium may be a tangible medium, which may include or store a program used by or used in combination with an instruction execution system, apparatus or device. The machine-readable medium may be a machine-readable signal medium or a machine-readable storage medium. The machine-readable medium may include an electronic, magnetic, optical, electromagnetic, infrared, or semiconductor system, apparatus, or device, or any suitable combination thereof. The machine-readable storage medium may include an electrical connection on the basis of one or more wires, a portable computer disk, a hard disk, RAM, ROM, an erasable programmable read-only memory (EPROM or a flash memory), an optical fiber, CD-ROM, an optical storage device, a magnetic storage device, or any suitable combination thereof.

According to one or more embodiments of the disclosure, [Example 1] provides an image display method. The method includes:

a first image and a second image that are to be displayed are obtained;

in response to receiving a display triggering operation for triggering image display, the first image is displayed in an image display area;

in response to detecting that a display condition of a target transition image is satisfied, the target transition image is displayed in the image display area, where the target transition image is a fusion image of the first image and the second image; and in response to detecting that a display condition of the second image is satisfied, the second image is displayed in the image display area.

According to one or more embodiments of the disclosure, [Example 2] provides the image display method. In the method:

optionally, displaying the first image in the image display area includes the following:

the first image is enlarged and displayed in the image display area.

According to one or more embodiments of the disclosure, [Example 3] provides the image display method. In the method:

optionally, enlarging and displaying the first image in the image display area includes the following:

the first image is enlarged and displayed according to a target enlargement area of the first image, and the target enlargement area is displayed in the image display area.

According to one or more embodiments of the disclosure, [Example 4] provides the image display method. In the method:

optionally, the display condition of the target transition image includes at least one of the following conditions:

a ratio of display progress of the first image to a total display duration of the first image, the target transition image and the second image reaches a preset ratio threshold;

a total display duration of the first image reaches a preset first image total display duration threshold;

a display effect of the first image reaches a preset display effect;

a display size of the first image reaches a preset display size threshold;

a static display duration of the first image being statically displayed reaches a preset static display duration threshold;

a dynamic display duration of the first image being dynamically displayed reaches a preset dynamic display duration threshold; and a preset gradient sampling step corresponding to the target transition image changes, where the preset gradient sampling step is configured to measure a distance between pixel points in an image.

According to one or more embodiments of the disclosure, [Example 5] provides the image display method. In the method:

optionally, the method further includes, after it is detected that the display condition of the target transition image is satisfied, and before the target transition image is displayed in the image display area, the following:

an area display image of the first image displayed in the image display area is obtained, where a display size of the second image is less than a display size of the area display image; and an image fusion is performed on the second image and the area display image to obtain the target transition image.

According to one or more embodiments of the disclosure, [Example 6] provides the image display method. In the method:

optionally, the method further includes, before the area display image, displayed in the image display area, of the first image is obtained, the following:

the first image is gradually enlarged from an original size of the first image, and the second image is gradually enlarged from a preset size, where the preset size is less than an original size of the second image.

According to one or more embodiments of the disclosure, [Example 7] provides the image display method. In the method:

optionally, performing the image fusion on the second image and the area display image to obtain the target transition image include the following:

the area display image is used as a background image, and a target fusion area corresponding to the second image and the background image is determined;

for each to-be-fused pixel point in the target fusion area, a first gradient value of the to-be-fused pixel point corresponding to the background image and a second gradient value of the to-be-fused pixel point corresponding to the second image are determined;

a target color value of the to-be-fused pixel point is determined according to the first gradient value and the second gradient value corresponding to the to-be-fused pixel point; and the target transition image is obtained according to the target color value of each to-be-fused pixel point in the target fusion area.

According to one or more embodiments of the disclosure, [Example 8] provides the image display method. In the method:

optionally, determining the target color value of the to-be-fused pixel point according to the first gradient value and the second gradient value corresponding to the to-be-fused pixel point includes the following:

the first gradient value of the to-be-fused pixel point is determined according to a color value of each pixel point in the background image, and the second gradient value of the to-be-fused pixel point is determined according to a color value of each pixel point in the second image.

According to one or more embodiments of the disclosure, [Example 9] provides the image display method. In the method:

optionally, determining the second gradient value of the to-be-fused pixel point according to the color value of each pixel point in the second image includes the following:

a target gradient sampling step corresponding to the to-be-fused pixel point is determined, where the target gradient sampling step indicates a target distance between a to-be-determined reference pixel point and the to-be-fused pixel point;

a reference pixel point in the second image corresponding to the to-be-fused pixel point is determined according to position information of the to-be-fused pixel point in the image display area, the target gradient sampling step, and a preset gradient computation direction; and the second gradient value of the to-be-fused pixel point is determined according to a color value of the reference pixel point in the second image.

According to one or more embodiments of the disclosure, [Example 10] provides the image display method. In the method:

optionally, determining the target color value of the to-be-fused pixel point according to the first gradient value and the second gradient value corresponding to the to-be-fused pixel point includes the following:

a color value corresponding to a greater one of the first gradient value and the second gradient value that are corresponding to the to-be-fused pixel point is selected as the target color value of the to-be-fused pixel point.

According to one or more embodiments of the disclosure, [Example 11] provides the image display method. In the method:

optionally, obtaining the target transition image according to the target color value of each to-be-fused pixel point in the target fusion area includes the following:

an intermediate transition image is obtained according to the target color value of each to-be-fused pixel point in the target fusion area;

the intermediate transition image is used as a background image, and operations of determining the target fusion area corresponding to the second image and the background image, determining, for each to-be-fused pixel point in the target fusion area, a first gradient value, corresponding to the background image, and a second gradient value, corresponding to the second image, of the to-be-fused pixel point, determining a target color value of the to-be-fused pixel point according to the first gradient value and the second gradient value corresponding to the to-be-fused pixel point, and obtaining the intermediate transition image according to the target color value of each to-be-fused pixel point in the target fusion area are repeatedly executed; and in response to detecting that a fusion ending condition is satisfied, the intermediate transition image is used as the target transition image.

According to one or more embodiments of the disclosure, [Example 12] provides the image display method. In the method:

optionally, determining the target fusion area corresponding to the second image and the background image includes the following:

a display area corresponding to the area display image is determined as a target fusion area corresponding to the second image and the area display image; and alternatively, a target display area of the second image in the first image is determined as a target fusion area corresponding to the second image and the area display image.

According to one or more embodiments of the disclosure, [Example 13] provides the image display method. In the method:

optionally, displaying the second image in the image display area includes the following:

the target transition image and the second image are superposed and displayed in the image display area, where transparency of the target transition image changes from high to low, and transparency of the second image changes from low to high.

According to one or more embodiments of the disclosure, [Example 14] provides the image display method. In the method:

optionally, the display condition of the second image includes at least one of the following conditions:

a transitional display duration of the target transition image reaches preset transitional display duration;

a display frame number of the target transition image reaches a preset display frame number threshold; and an image size of the second image reaches a preset display size.

According to one or more embodiments of the disclosure, [Example 15] provides the image display method. In the method:

optionally, displaying the target transition image in the image display area includes the following:

two or more target transition images are sequentially displayed in the image display area, where a first target transition image is obtained by fusing the first image and the second image, and a target transition image subsequent to the first target transition image is obtained by fusing a previous displayed target transition image and the second image.

According to one or more embodiments of the disclosure, [Example 16] provides an image display apparatus. The apparatus includes:

an image obtaining module configured to obtain a first image and a second image that are to be displayed;

a first display module configured to display, in response to receiving a display triggering operation for triggering image display, the first image in an image display area;

a transition display module configured to display, in response to detecting that a display condition of a target transition image is satisfied, the target transition image in the image display area, where the target transition image is a fusion image of the first image and the second image; and a second display module configured to display, in response to detecting that a display condition of the second image is satisfied, the second image in the image display area.

We claim:

1. An image display method, comprising:
    obtaining a first image and a second image that are to be displayed;
    displaying, in response to receiving a display triggering operation for triggering image display, the first image in an image display area;
    displaying, in response to detecting that a display condition of a target transition image is satisfied, the target transition image in the image display area, wherein the target transition image is a fusion image of the first image and the second image, and the display condition of the target transition image comprises a preset gradient sampling step corresponding to the target transition image changes, wherein the preset gradient sampling step is configured to measure a distance between pixel points in an image; and
    displaying, in response to detecting that a display condition of the second image is satisfied, the second image in the image display area;
    the method further comprising: after detecting that the display condition of the target transition image is satisfied, and before displaying the target transition image in the image display area,
    obtaining an area display image of the first image displayed in the image display area, wherein a display size of the second image is less than a display size of the area display image; and
    performing an image fusion on the second image and the area display image to obtain the target transition image;
    wherein performing the image fusion on the second image and the area display image to obtain the target transition image comprises:
    using the area display image as a background image, and determining a target fusion area corresponding to the second image and the background image;
    determining, for each to-be-fused pixel point in the target fusion area, a first gradient value of the to-be-fused pixel point corresponding to the background image and a second gradient value of the to-be-fused pixel point corresponding to the second image, wherein the first gradient value is configured to indicate a speed of color change of the to-be-fused pixel point corresponding to the background image and is computed according to a color value of a neighboring pixel point of the to-be-fused pixel point corresponding to the background image, and the second gradient value is configured to indicate a speed of color change of the to-be-fused pixel point corresponding to the second image and is computed according to a color value of a neighboring pixel point of the to-be-fused pixel point corresponding to the second image;
    determining a target color value of the to-be-fused pixel point, according to the first gradient value and the second gradient value corresponding to the to-be-fused pixel point; and
    obtaining the target transition image according to the target color value of each to-be-fused pixel point in the target fusion area.

2. The method according to claim 1, wherein displaying the first image in the image display area comprises:
    enlarging and displaying the first image in the image display area.

3. The method according to claim 2, wherein enlarging and displaying the first image in the image display area comprises:
    enlarging and displaying the first image according to a target enlargement area of the first image, and displaying the target enlargement area in the image display area.

4. The method according to claim 1, wherein the display condition of the target transition image further comprises at least one of the following conditions:
    a ratio of display progress of the first image to a total display duration of the first image, the target transition image and the second image reaches a preset ratio threshold;
    a total display duration of the first image reaches a preset first image total display duration threshold;
    a display effect of the first image reaches a preset display effect;
    a display size of the first image reaches a preset display size threshold;

a static display duration of the first image being statically displayed reaches a preset static display duration threshold; or a dynamic display duration of the first image being dynamically displayed reaches a preset dynamic display duration threshold.

5. The method according to claim 1, further comprising: before obtaining the area display image of the first image displayed in the image display area, gradually enlarging the first image from an original size of the first image, and gradually enlarging the second image from a preset size, wherein the preset size is less than an original size of the second image.

6. The method according to claim 1, wherein determining the target color value of the to-be-fused pixel point according to the first gradient value and the second gradient value corresponding to the to-be-fused pixel point comprises:

determining the first gradient value of the to-be-fused pixel point according to a color value of each pixel point in the background image, and determining the second gradient value of the to-be-fused pixel point according to a color value of each pixel point in the second image.

7. The method according to claim 6, wherein determining the second gradient value of the to-be-fused pixel point according to the color value of each pixel point in the second image comprises:

determining a target gradient sampling step corresponding to the to-be-fused pixel point, wherein the target gradient sampling step indicates a target distance between a to-be-determined reference pixel point and the to-be-fused pixel point;

determining a reference pixel point in the second image corresponding to the to-be-fused pixel point according to position information of the to-be-fused pixel point in the image display area, the target gradient sampling step, and a preset gradient computation direction; and determining the second gradient value of the to-be-fused pixel point according to a color value of the reference pixel point in the second image.

8. The method according to claim 1, wherein determining the target color value of the to-be-fused pixel point according to the first gradient value and the second gradient value corresponding to the to-be-fused pixel point comprises:

selecting a color value corresponding to a greater one of the first gradient value and the second gradient value that are corresponding to the to-be-fused pixel point as the target color value of the to-be-fused pixel point.

9. The method according to claim 1, wherein obtaining the target transition image according to the target color value of each to-be-fused pixel point in the target fusion area comprises:

obtaining an intermediate transition image according to the target color value of each to-be-fused pixel point in the target fusion area;

using the intermediate transition image as a background image, and repeatedly executing an operation of determining the target fusion area corresponding to the second image and the background image; determining, for each to-be-fused pixel point in the target fusion area, the first gradient value of the to-be-fused pixel point corresponding to the background image and the second gradient value of the to-be-fused pixel point corresponding to the second image, determining the target color value of the to-be-fused pixel point according to the first gradient value and the second gradient value corresponding to the to-be-fused pixel point, and obtaining the intermediate transition image according to the target color value of each to-be-fused pixel point in the target fusion area; and using, in response to detecting that a fusion ending condition is satisfied, the intermediate transition image as the target transition image.

10. The method according to claim 1, wherein determining the target fusion area corresponding to the second image and the background image comprises:

determining a display area corresponding to the area display image as a target fusion area corresponding to the second image and the area display image; or determining a target display area of the second image in the first image as a target fusion area corresponding to the second image and the area display image.

11. The method according to claim 1, wherein displaying the second image in the image display area comprises:

superposing and displaying the target transition image and the second image in the image display area, wherein transparency of the target transition image changes from high to low, and transparency of the second image changes from low to high.

12. The method according to claim 1, wherein the display condition of the second image comprises at least one of the following conditions that:

a transitional display duration of the target transition image reaches preset transitional display duration;

a display frame number of the target transition image reaches a preset display frame number threshold; and an image size of the second image reaches a preset display size.

13. The method according to claim 1, wherein displaying the target transition image in the image display area comprises:

sequentially displaying two or more target transition images in the image display area, wherein a first target transition image is obtained by fusing the first image and the second image, and a target transition image subsequent to the first target transition image is obtained by fusing a previous displayed target transition image and the second image.

14. An electronic device, comprising:

a processor; and a storage means configured to store a program, wherein when the program is executed by the processor, the processor is caused to:

obtain a first image and a second image that are to be displayed;

display, in response to receiving a display triggering operation for triggering image display, the first image in an image display area;

display, in response to detecting that a display condition of a target transition image is satisfied, the target transition image in the image display area, wherein the target transition image is a fusion image of the first image and the second image, and the display condition of the target transition image comprises a preset gradient sampling step corresponding to the target transition image changes, wherein the preset gradient sampling step is configured to measure a distance between pixel points in an image; and display, in response to detecting that a display condition of the second image is satisfied, the second image in the image display area;

wherein processor is further caused to: after detecting that the display condition of the target transition image is satisfied, and before displaying the target transition image in the image display area, obtain an area display image of the first image displayed in the image display area, wherein a display size of the second image is less than a display size of the area display image; and perform an image fusion on the second image and the area display image to obtain the target transition image;

wherein the processor is caused to perform the image fusion on the second image and the area display image to obtain the target transition image by being caused to:

use the area display image as a background image, and determine a target fusion area corresponding to the second image and the background image;

determine, for each to-be-fused pixel point in the target fusion area, a first gradient value of the to-be-fused pixel point corresponding to the background image and a second gradient value of the to-be-fused pixel point corresponding to the second image, wherein the first gradient value is configured to indicate a speed of color change of the to-be-fused pixel point corresponding to the background image and is computed according to a color value of a neighboring pixel point of the to-be-fused pixel point corresponding to the background image, and the second gradient value is configured to indicate a speed of color change of the to-be-fused pixel point corresponding to the second image and is computed according to a color value of a neighboring pixel point of the to-be-fused pixel point corresponding to the second image;

determine a target color value of the to-be-fused pixel point, according to the first gradient value and the second gradient value corresponding to the to-be-fused pixel point; and obtain the target transition image according to the target color value of each to-be-fused pixel point in the target fusion area.

15. The electronic device according to claim 14, wherein the processor being caused to display the first image in the image display area comprises being caused to:
enlarge and display the first image in the image display area.

16. The electronic device according to claim 15, wherein the processor being caused to enlarge and display the first image in the image display area comprises being caused to:
enlarge and display the first image according to a target enlargement area of the first image, and display the target enlargement area in the image display area.

17. The electronic device according to claim 14, wherein the display condition of the target transition image further comprises at least one of the following conditions:
a ratio of display progress of the first image to a total display duration of the first image, the target transition image and the second image reaches a preset ratio threshold;
a total display duration of the first image reaches a preset first image total display duration threshold;
a display effect of the first image reaches a preset display effect;
a display size of the first image reaches a preset display size threshold;
a static display duration of the first image being statically displayed reaches a preset static display duration threshold; or
a dynamic display duration of the first image being dynamically displayed reaches a preset dynamic display duration threshold.

18. A non-transitory computer-readable storage medium, storing a computer program thereon, wherein the computer program, when being executed by a processor, implements:
obtaining a first image and a second image that are to be displayed;
displaying, in response to receiving a display triggering operation for triggering image display, the first image in an image display area;
displaying, in response to detecting that a display condition of a target transition image is satisfied, the target transition image in the image display area, wherein the target transition image is a fusion image of the first image and the second image, and the display condition of the target transition image comprises a preset gradient sampling step corresponding to the target transition image changes, wherein the preset gradient sampling step is configured to measure a distance between pixel points in an image; and
displaying, in response to detecting that a display condition of the second image is satisfied, the second image in the image display area;
the computer program further implements: after detecting that the display condition of the target transition image is satisfied, and before displaying the target transition image in the image display area,
obtaining an area display image of the first image displayed in the image display area, wherein a display size of the second image is less than a display size of the area display image; and
performing an image fusion on the second image and the area display image to obtain the target transition image;
wherein performing the image fusion on the second image and the area display image to obtain the target transition image comprises:
using the area display image as a background image, and determining a target fusion area corresponding to the second image and the background image;
determining, for each to-be-fused pixel point in the target fusion area, a first gradient value of the to-be-fused pixel point corresponding to the background image and a second gradient value of the to-be-fused pixel point corresponding to the second image, wherein the first gradient value is configured to indicate a speed of color change of the to-be-fused pixel point corresponding to the background image and is computed according to a color value of a neighboring pixel point of the to-be-fused pixel point corresponding to the background image, and the second gradient value is configured to indicate a speed of color change of the to-be-fused pixel point corresponding to the second image and is computed according to a color value of a neighboring pixel point of the to-be-fused pixel point corresponding to the second image;
determining a target color value of the to-be-fused pixel point, according to the first gradient value and the second gradient value corresponding to the to-be-fused pixel point; and
obtaining the target transition image according to the target color value of each to-be-fused pixel point in the target fusion area.

* * * * *